US005518219A

United States Patent [19]

Wenzel et al.

[11] Patent Number: 5,518,219

[45] Date of Patent: May 21, 1996

[54] PROPORTIONAL PRESSURE CONTROL PILOT VALVE

[75] Inventors: Craig E. Wenzel, Menomonee Falls; Thomas J. Stobbs, Brookfield, both of Wis.

[73] Assignee: Applied Power Inc., Butler, Wis.

[21] Appl. No.: 382,466

[22] Filed: Jan. 31, 1995

[51] Int. Cl.[6] ........ F16K 31/02

[52] U.S. Cl. ........ 251/129.15; 335/262

[58] Field of Search ........ 251/129.01, 129.08, 251/129.15; 335/255, 260, 261, 257, 279, 262

[56] References Cited

U.S. PATENT DOCUMENTS

| | | | |
|---|---|---|---|
| 4,153,890 | 5/1979 | Coors | 335/260 |
| 4,638,974 | 1/1987 | Zeuner et al. | 251/129.15 |
| 4,783,049 | 11/1988 | Northman et al. | 251/129.15 X |
| 5,011,113 | 4/1991 | Stobbs et al. . | |
| 5,067,687 | 11/1991 | Patel et al. . | |
| 5,178,359 | 1/1993 | Stobbs et al. . | |
| 5,328,147 | 7/1994 | Stobbs . | |
| 5,377,720 | 1/1995 | Stobbs et al. . | |

*Primary Examiner*—Kevin Lee

*Attorney, Agent, or Firm*—Quarles & Brady

[57] ABSTRACT

A proportional pressure control valve has a poppet including a control pin for seating against the seat and which is pressed into a generally tubular armature. One end of the armature proximal to the seat has an enlarged diameter and fits into a cup shaped recess of the housing in an extreme position of the poppet. A smaller diameter of the armature is journaled in a magnetic sleeve bearing at a distal end of the poppet and the control pin is journaled in a sleeve bearing at the proximal end of the popper. A plastic plug covers the distal end of the armature and an annular gap is created at the distal end of the armature bearing between the armature and the housing.

12 Claims, 1 Drawing Sheet

PROPORTIONAL PRESSURE CONTROL PILOT VALVE

FIELD OF THE INVENTION

This invention relates to proportional pressure control valves and in particular to such a valve which is adapted to be a pilot pressure control valve.

DISCUSSION OF THE PRIOR ART

Electro-magnetically operated hydraulic valves for controlling a hydraulic pressure in proportion to the modulation ratio of a pulse width modulated electrical signal, or in proportion to a voltage level applied to them, are well known. To accurately and reliably control the pressure in response to the electrical signal in such valves, instability can be a problem.

Instability and non-repeatability in the operation of an electromagnetic hydraulic valve can especially be a problem when the control is of relatively high pressures and low flow rates. Instability can make such valves unpredictable, and contribute to non-linearity in the response of the valve. Instability and non-repeatability in the operation of a hydraulic valve can be caused by many factors, including friction, hysteresis, and insufficient magnetic forces in comparison to the hydraulic forces to which the popper of the valve is subjected. In addition, although most hydraulic valves have a spring biasing them either open or closed, it has been found that under some conditions, a spring can introduce additional instability in the operation of the valve.

Summary of the Invention

The invention provides a proportional pressure control valve which addresses the above problems. As in prior art valves of this type, a valve of the invention has a housing with an inlet port and an outlet port formed in the housing, a valve seat in the housing between the inlet and outlet ports, a popper moveable in the housing toward or away from the seat to vary a flow passage between the inlet and outlet ports, an armature for moving the popper and an electro-magnetic coil for creating a magnetic field for moving the armature. However, in a valve of the invention, one end of the armature is enlarged in diameter relative to the other end and the housing defines a cup shaped recess for receiving the enlarged end when the popper is in an extreme axial position. This creates a favorable flux path at the enlarged end between the housing and armature which increases the available magnetic force between the housing and armature.

Preferably, in the extreme axial position in which the enlarged diameter of the armature is received in the housing, the popper closes the valve seat, since it is in closing the valve seat that the greater magnetic force provided by the invention is best utilized. Therefore, in this aspect, it is preferred that flow from the inlet port to the outlet port past the valve seat tends to unseat the popper.

In another useful aspect for increasing the stability and repeatability of the valve, a reduced diameter portion of the armature on one side of the enlarged diameter is journaled in a distal axial bearing which is secured to the housing, and a portion of the popper on the other side of the enlarged diameter is journaled in a proximal axial bearing which is secured to the housing. The bearings serve to guide the popper axially and to reduce instability as a result. In addition, the bearings provide a low friction surface to reduce non-repeatability due to hysteresis.

In this aspect, the distal axial bearing preferably has a larger inside diameter than the proximal axial bearing, and the two bearings are desirably spaced as far apart as possible, which contributes to stability, reduces binding and counteracts magnetic field side loading on the armature. In addition, the distal axial bearing is preferably made of a magnetic material which creates a flux path through it so as to maintain the magnetic force of attraction between the proximal end of the armature and the housing. In addition, there is preferably provided an annular gap between the armature and the housing on the distal side of the distal bearing, which helps reduce the magnetic force of attraction between the distal end of the armature and the housing. This magnetic force is opposite in direction to the desired magnetic force at the proximal end of the armature.

In another aspect, a plastic plug covers the distal end of the armature, which reduces the volume inside of and at the distal end of the armature to occupy space which may otherwise be occupied by air, which would cause instability. A damping orifice is preferably formed in the plug to allow controlled fluid passage through it. In addition, the plug abuts the housing in an extreme open position of the popper to act as a soft stop or bumper.

In another preferred aspect, the popper includes a pin having a generally square cross-section, the armature is generally tubular, and the pin is pressed into the lumen of the armature. The square cross-section of the pin provides axial flow passages between the pin and the lumen to provide for pressure equalization through them. The proximal end of the pin is preferably made conical so that as it is moved toward and away from the seat it varies the flow area through the seat.

In another aspect, the valve is preferably springless, so that the popper is free floating. Thereby, no instabilities are introduced by springs or other mechanical biasing elements.

These and other features and advantages of the invention will be apparent from the following detailed description and from the drawings.

DETAILED DESCRIPTION OF THE PREFERRED EMBODIMENTS

Figure 1:
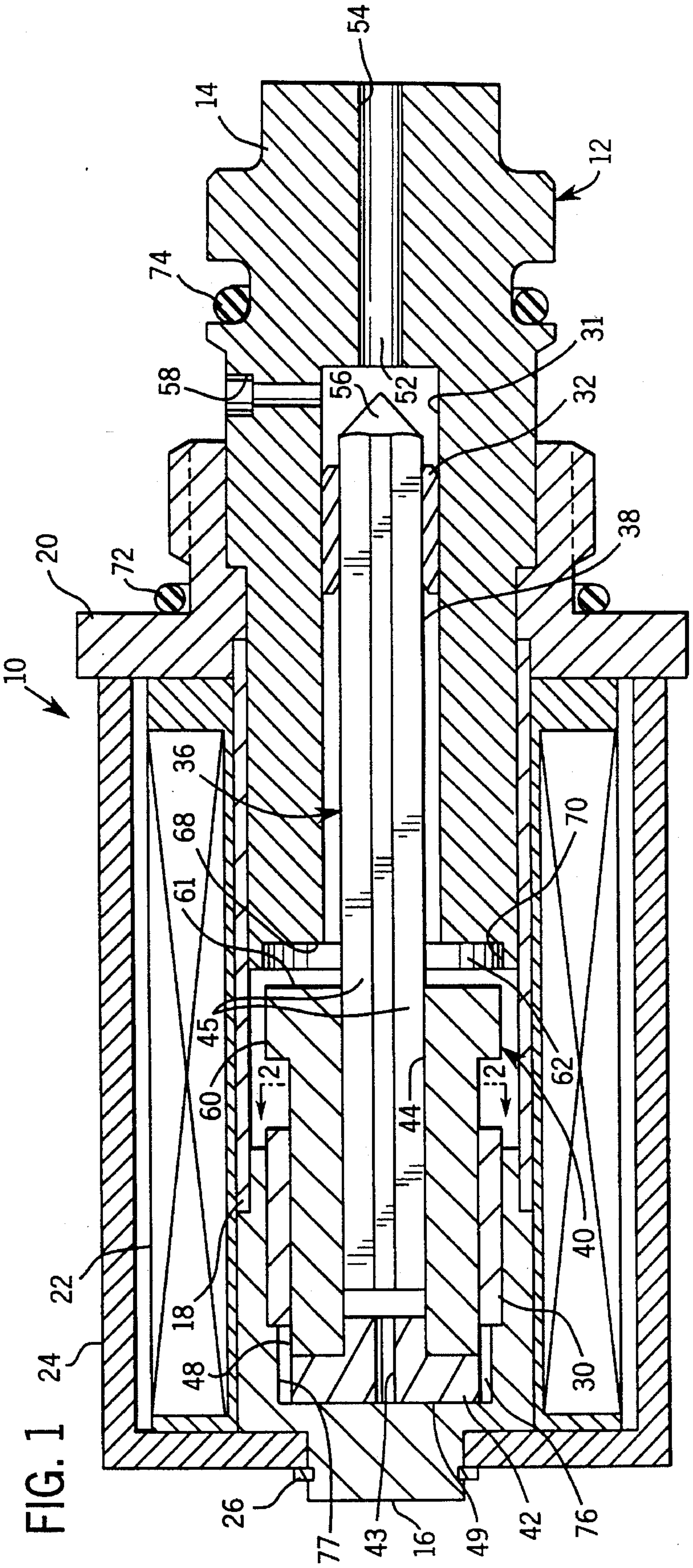
FIG. 1 is a cross-sectional view of a hydraulic valve of the invention.

FIG. 1 illustrates a valve 10 of the invention which includes a housing 12. The housing 12 has a lower body 14 connected by a press fit to an upper body 20. The upper body 20, an end cap 16 and a sleeve 18 and upper body 20 are brazed together to make a fluid tight assembly. An electro-magnetic coil 22 is provided around the sleeve 18 and end cap 16, and the coil 22 is covered by cover 24, which is secured to the valve 10 by retaining ring 26. A sleeve bearing 30 is secured, for example by pressing or brazing, in the end cap 16, and another sleeve bearing 32 is secured by pressing or brazing in an axial bore 31 of the lower body 14. The end cap 16, lower body 14 and upper body 20 are preferably made of a magnetic material such as steel, and the sleeve 18 is preferably made of a nonmagnetic material such as stainless steel.

The bearings 30 and 32 are made of a lubricious and structurally rigid bearing material. Preferably, these bearings have a steel outer layer and an inner layer (e.g., 0.010 inch thick) of bearing quality bronze powder sintered onto the steel backing. The porous bronze is impregnated with a homogeneous mixture of polytetrafluoroethylene (PTFE) and lead, followed by an overlay of a thin (e.g., 0.001 inch thick) film of PTFE-lead. Bearings of this structure are commercially available under the designation "DU" from Garlock Bearings Inc., 700 Mid Atlantic Parkway, Thorofare, N.J. 08086, a division of Colt Industries.

Figure 2:
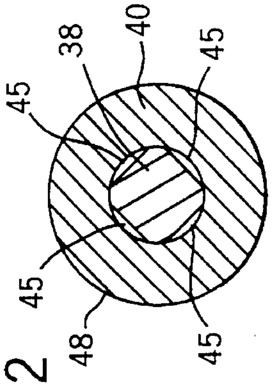
FIG. 2 is a cross-sectional view of the valve of FIG. 1 as viewed from the plane of the line 2—2 of FIG. 1.

A popper 36 including a control pin 38 pressed into an axial bore of an armature 40 and also a plastic spacer plug 42 over the distal end of the armature 40 is journaled in the sleeve bearings 30 and 32 so as to be axially slidable therein. The armature 40 is a magnetic material such as iron or steel, and the pin 38 is preferably nonmagnetic stainless steel. Referring particularly to FIG. 2, the cross-section of the pin 38 is generally square with the corners rounded to approximately the same radius as the axial lumen 44 of the armature 40. Thus, the pin 38 is pressed into the lumen 44 with its rounded corners engaging the lumen 44 in a tight press fit. The inner diameter of the sleeve bearing 32 also conforms to the radius of the corners of the pin 38 with a sliding fit. Flow passageways 45 are defined between the flat sides of the pin 38 and the lumen of the armature 40 and the lumen of bearing 32, which equalizes the pressure from one end of the pin 38 to the other. The internal diameter of the bearing 30 conforms to the smaller diameter 48 of the armature 40, which is on the distal side of flange 60 of armature 40, to provide a sliding fit.

The enlarged diameter flange 60 is provided on the armature and has an axial dimension which continues from the smaller diameter 48 to the proximal end 61 of the armature 40. As used herein, proximal and distal are used relative to the valve seat 52 which is formed in the lower body 14 and is co-axial with inlet port 54. The proximal end 56 of control pin 38 is conical and co-axial with seat 52 so that as the end 56 is moved toward or away from the seat 52, the flow area through the seat 52 is varied.

.Outlet port 58 is provided in lower body 14, and is generally perpendicular to the axis of the control pin 38, seat 52, and port 54. Thus, seat 52 is provided between the inlet port 54 and the outlet port 58, and the popper 36 is moveable toward or away from the seat so as to vary the flow area between the ports 54 and 58.

As stated and illustrated, the proximal end 61 of the armature 40 is enlarged at 60 relative to the smaller diameter portion 48, which is defined at the distal end 49 of the armature. A cup shaped recess 62 is provided at the distal end of the lower body 14 and the enlarged diameter 60 fits inside the recess 62 when the poppet 36 is in its extreme closed position. In this position, proximal end 56 of pin 38 seats against seat 52, and a small gap, for example 0.010 inches, resides between proximal axial face 61 of the armature 40 and distal axial face 68 of the lower body 14. It is noted that the distal axial face 68 as well as a cylindrical lip 70 of the lower body 14 define the cup shaped recess 62. O-rings 72 and 74 are provided around the housing 12 so that the housing 12 may be inserted into a bore with the O-ring 74 sealing between the ports 54 and 58 and the O-ring 72 sealing against leakage of hydraulic fluid out of the bore (not shown) in which the valve 10 is received.

An annular air gap 76 is provided at the distal end of the bearing 30 between the armature 40 and plug 42 and bore 77 of the pole piece 16. The sleeve bearing 30, being made at least in part of a magnetic material such as steel, or steel with a thin coating of brass, teflon and lead for lubricity as stated above, creates a favorable magnetic flux path that decreases the amount of flux off the distal end of the armature. Flux off the distal end of the armature tends to pull the armature so as to open the poppet 36, which is not desired, so that decreasing it has a desirable effect. In addition, the creation of the annular air gap 76 also reduces the magnetic flux in this direction.

On the other hand, the enlargement of the diameter at 60 in the cup shaped recess 62 helps to increase the magnetic force tending to close the popper 36 when the coil 22 is energized, thereby increasing the available magnetic closing force, as is desired.

It is preferable to space the bearings 30 and 32 as far apart as possible, while still maintaining adequate sliding surface area contact in all positions of the popper 36. In addition, it is preferred to position the bearing 30 toward the distal end of the armature 40 and make it larger in internal diameter than the bearing 32 so as to provide maximum resistance to and control over any magnetic side loading exerted on the poppet 36 by the coil 22. Thus, the popper 36 is accurately guided axially in the housing 12.

The plug 42 is provided to reduce the empty volume at the distal end of the armature 40, so as to reduce any air which may otherwise be present there, which would create instability. It also provides a relatively soft armature stop, and a magnetic flux break between the end of the armature 40 and the pole piece 16, so as to prevent the armature 40 from magnetically sticking to the pole piece 16. A damping orifice 43 is preferably provided in the plug 42 to provide for controlled passage of fluid through it between the distal end of pin 38 and bore 77.

It should be noted that the popper 36 is free floating, meaning that it is not biased toward any position by a spring or other biasing means. Thus, instability which may otherwise be introduced by a spring is avoided in the valve 10.

Many modifications and variations to the preferred embodiment described will be apparent to those skilled in the art. Therefore, the invention should not be limited to the embodiment described but should be defined by the claims which follow.

We claim:

1. In a proportional pressure control valve of the type having a housing with an inlet port and an outlet port formed in said housing, a valve seat in said housing between said inlet and outlet ports, a popper moveable in said housing toward or away from said seat to vary a flow passage between said inlet and outlet ports, said popper including an armature for moving said popper and an electro-magnetic coil for creating a magnetic field for moving said armature, the improvement wherein:

one end of said armature is enlarged in diameter relative to another end and said housing defines a cup shaped recess for receiving said one end of said armature when said poppet is in an extreme axial position;

a portion of said armature on one side of said enlarged diameter is of a diameter less than said enlarged diameter and journaled in a distal axial bearing which is secured to said housing, and a portion of said popper on the other side of said enlarged diameter is journaled in a proximal axial bearing which is secured to said housing, said bearings serving to guide said poppet axially; and said distal axial bearing is made of a magnetic material which creates a flux path through it.

2. The improvement of claim 1, wherein in said extreme axial position said popper closes said valve seat.

3. The improvement of claim 2, wherein flow from said inlet port to said outlet port past said valve seat tends to unseat said poppet.

4. The improvement of claim 1, wherein said distal axial bearing has a larger inside diameter than said proximal axial bearing.

5. The improvement of claim 1, wherein there is an annular gap between said armature and said housing on a side of said distal bearing which is distal from said enlarged diameter of said armature.

6. The improvement of claim 1, wherein a plastic plug overlies said other end of said armature.

7. The improvement of claim 6, wherein a damping orifice is formed in said plug.

8. The improvement of claim 6, wherein said plug abuts said housing in an extreme open position of said poppet.

9. The improvement of claim 1, wherein said poppet comprises a pin having a generally square cross-section.

10. The improvement of claim 9, wherein a proximal end of said pin is conical for varying the flow area through said seat.

11. The improvement of claim 9, wherein said pin is pressed into a cylindrical bore of said armature.

12. The improvement of claim 1, wherein said poppet is axially free floating in said housing.

* * * * *

UNITED STATES PATENT AND TRADEMARK OFFICE

CERTIFICATE OF CORRECTION

Patent No. : 5,518,219

Dated : May 21, 1996

Inventors : Craig E. Wenzel, et al.

It is certified that error appears in the above-identified patent and that said Letters Patent is hereby corrected as shown below:

In the Abstract, line 9, change "popper" to --poppet--.

Col. 1, line 27, change "popper" to --poppet--.

Col. 1, line 40, change "popper" to --poppet--.

Col. 1, line 42, change "popper" to --poppet--.

Col. 1, line 47, change "popper" to --poppet--.

Col. 1, line 53, change "popper" to --poppet--.

Col. 1, line 57, change "popper" to --poppet--.

Col. 1, line 62, change "popper" to --poppet--.

Col. 1, line 65, change "popper" to --poppet--.

Col. 2, line 22, change "popper" to --poppet--.

Col. 2, line 24, change "popper" to --poppet--.

Col. 2, line 34, change "popper" to --poppet--.

Col. 3, line 9, change "popper" to --poppet--.

Col. 3, line 41, change "popper" to --poppet--.

Col. 4, line 9, change "popper" to --poppet--.

UNITED STATES PATENT AND TRADEMARK OFFICE

CERTIFICATE OF CORRECTION

Patent No. : 5,518,219

Dated : May 21, 1996

Inventors : Craig E. Wenzel, et al.

It is certified that error appears in the above-identified patent and that said Letters Patent is hereby corrected as shown below:

Col. 4, line 14, change "popper" to --poppet--.

Col. 4, line 19, change "popper" to --poppet--.

Col. 4, line 31, change "popper" to --poppet--.

Col. 4, line 43 (claim 1), change "popper" to --poppet--.

Col. 4, line 45 (claim 1), change "popper" to --poppet--.

Col. 4, line 46 (claim 1), change "popper" to --poppet--.

Col. 4, line 56 (claim 1), change "popper" to --poppet--.

Col. 4, line 64 (claim 2), change "popper" to --poppet--.

Signed and Sealed this

Thirteenth Day of August, 1996

Attest:

Bruce Lehman

BRUCE LEHMAN

*Attesting Officer*

*Commissioner of Patents and Trademarks*